United States Patent Office 3,110,541
Patented Nov. 12, 1963

3,110,541
PROCESS FOR DYEING AND PRINTING CELLULOSE TEXTILE MATERIALS WITH SOLUBLE VAT DYESTUFFS
Kurt Weber, Paul Ulrich, Heinrich Bruengger, and Max Staeuble, all of Basel, Switzerland, assignors to Ciba Limited, Basel, Switzerland, a company of Switzerland
No Drawing. Filed Aug. 22, 1960, Ser. No. 50,862
Claims priority, application Switzerland Aug. 27, 1959
12 Claims. (Cl. 8—34)

This invention provides a process for dyeing or printing textile materials, more especially textile materials of cellulose, with vat-dyestuffs in which at least one active hydrogen atom has been replaced by an organic acyl radical containing at least one group imparting solubility in water, wherein, before or during the dyeing or printing operation, the dyestuff is reduced to the leuco-form in the presence of a reducing agent and an alkali, the organic acyl radical is split off, and the leuco-compound on the fiber is oxidized.

The vat-dyestuffs used in the process may belong to the anthraquinone, perylene, perinone, pyrenquinone or indigoid series. They advantageously contain the organic acyl radical bound in an ester-like or amide-like manner, that is to say through an oxygen atom or a nitrogen atom. As organic acyl radicals there may be mentioned the radicals of aliphatic, heterocyclic and preferably aromatic carboxylic or sulfonic acids. They may contain as a group imparting solubility in water a quaternary ammonium group, or advantageously at least one sulfonic acid group. Of special interest are acyl radicals of the formula

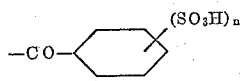

in which $n$ is the whole number 1, 2 or 3. As examples of acyl radicals there may be mentioned the radicals of the formulae

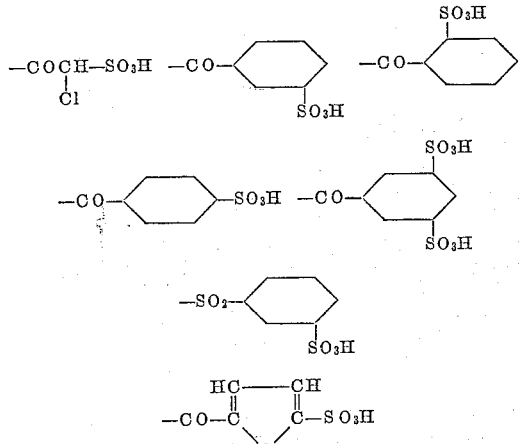

and

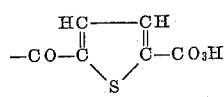

The acylated vat-dyestuffs used in the process can be made by known general methods, for example, by reacting a vat-dyestuff, which contains at least one active hydrogen atom, advantageously a hydroxyl or an —NH- group, with a sulfocarboxylic acid halide, especially a sulfobenzoic acid chloride, in the presence of a tertiary base, for example, pyridine. As vat-dyestuffs there may be mentioned acylamino-anthraquinones, in which the term "acyl" denotes not only a carboxylic acid radical, such as a benzoyl radical, but the radical of a heterocyclic compound containing at least once in the ring a grouping of the formula

Among these dyestuffs there may be mentioned more especially those obtainable by reacting an amino-anthraquinone with a halogen triazine, for example, cyanuric chloride or 1-phenyl-3:5-dichloro-triazine. As examples there may be mentioned dyestuffs obtainable by reacting one mol of cyanuric chloride with two mols of β-amino-anthraquinone and one mol of aniline, or by reacting one mol of cyanuric chloride with one mol of β-aminoanthraquinone, one mol of 4-aminoanthraquinone-2:1(N)-acridone and one mol of aniline or by reacting one mol of 2:4-dichloroquinazoline with two mols of β-amino-anthraquinone, or by reacting one mol of cyanuric chloride with one mol of amino-dibenzanthrone and two mols of aniline, or by reacting one mol of cyanuric chloride with one mol of aminodibenzanthrone and two mols of ethanolamine.

The dyeing should be carried out by the exhaustion method. As an alkali there is preferably used an alkali metal hydroxide. As reducing agents there may be used those used in dyeing with vat-dyestuffs, especially sodium-hydro-sulfite or, for example, thiourea dioxide. The concentration of the alkali metal hydroxide and the proportion of the reducing agent may be chosen in the same manner as in dyeing with vat-dyestuffs, for example, 5 to 30 parts by volume of sodium hydroxide solution of 30% strength may be used for every 1,000 parts by weight of dye liquor and about 2 to 5 parts by weight of sodium hydrosulfite for each part by weight of dyestuff. The alkali and the reducing agent may be added before or during the dyeing operation. The dyeing temperature is within the temperature range usual in dyeing with vat-dyestuffs, that is to say, within the range of 20° C. to 120° C. In the dye bath the acyl radical containing a group imparting solubility in water is split off and the vat-dyestuff is reduced to the leuco-compound fixed on the fiber and the after-treatment, such as rinsing and soaping at the boil, are also carried out by the methods usual in dyeing with vat-dyestuffs.

Alternatively, the dyestuffs may be applied to the material to be dyed by padding. For this purpose the material to be dyed is impregnated advantageously in the cold or at a moderately raised temperature with an aqueous solution of the dyestuff, and the impregnated material is squeezed in the usual manner. Advantageously the squeezing is carried out so that the impregnated material retains 50% to 140% of its weight of dyestuff solution. The treatment with the alkali and reducing agent is carried out after the impregnation and advantageously after drying the impregnated material. For this purpose the pre-treated material is impregnated with an aqueous solution containing the alkali and the reducing agent, then squeezed and steamed to fix the dyestuff. Instead of steaming the impregnated material may be treated with dry heat for example between temperatures of 80–150° C. The after-treatment, namely rinsing with cold water, oxidation, if desired, with the use of an oxidizing agent, for example, hydrogen peroxide or sodium perborate, and acidication and soaping at the boil are carried out in the usual manner.

Instead of impregnating the material, the dyestuff may be applied thereto by printing. In this case there is used a printing color, which contains the vat-dyestuff and the additions usual in vat-dyeing, such as potassium-carbonate, hydrosulfite and the thickening agent.

By the process of the invention excellent dyeings and prints are produced on textile materials, especially textile materials of cellulose.

It is known to use vat-dyestuffs which contain organic acyl radicals imparting solubility in water and capable of being split off for printing textile materials. However, that process is of little use for dyeing. Furthermore, prints produced by that process have a poorer dye strength and a poorer property of fastness than those produced by the process of the invention. In the known process the splitting off of the acyl radical imparting solubility in water is an additional operation carried out by after-treating the printed material with an aqueous alkali, or steaming it with ammonia or a volatile aliphatic amine. In the former case it is necessary to work in the presence of a concentrated solution of barium chloride or calcium chloride, in order to avoid dissolving the dyestuff from the fiber. Neither of these methods has found industrial application.

The following examples illustrate the invention, the parts and percentages being by weight unless otherwise stated and the relationship of parts by weight to parts by volume being the same as that of the kilogram to the liter.

EXAMPLE 1

Exhaustion Method 1.6 parts of the dyestuff obtained by condensing the dyestuff of the formula

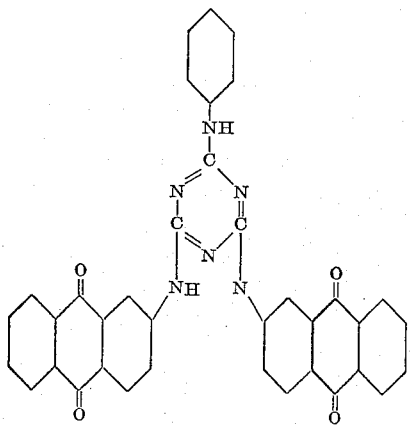

with benzoic acid-meta-sulfochloride in pyridine are dissolved in 250 parts of water. The resulting yellow solution is poured into a solution heated at 30° C. of 10 parts by volume of sodium hydroxide solution of 30% strength and 6 parts of sodium hydrosulfite in 1750 parts of water, whereby a red orange vat is spontaneously formed. 50 parts of cotton are dyed in the resulting dyebath for 45 minutes at 25–30° C. with addition of 60 parts of sodium chloride. The dyed material is oxidized, washed, acidified, again thoroughly rinsed and soaped at the boil, to yield a greenish yellow dyeing of excellent fastness properties.

When the condensation of the dyestuff of the above formula in pyridine is performed with benzoic acid-para-sulfochloride or with the reaction product of sulfur trioxide and benzoyl chloride (prepared as described in French Patent No. 872,771, delivered February 3, 1942, to Farbenindustrie Aktiengesellschaft, Frankfurt am Main, Germany) instead of with benzoic acid-meta-sulfochloride, water-soluble dyestuffs are likewise obtained which produce identical dyeings by the same dyeing method.

Identical dyeings are obtained with the water-soluble dyestuff obtained by condensing the dyestuff of the above formula with para-chloromethylbenzyl chloride in pyridine.

The dyestuff of German Patent No. 514,519, issued to Farbenindustrie Aktiengesellschaft, Frankfurt am Main, Germany, Example 1, prepared by condensing indigo with benzoic acid-meta-sulfochloride, can be dyed in a similar manner.

EXAMPLE 2

Pad-Jig Process

A cotton fabric is padded at 50° C. with a solution containing in 1000 parts of water 20 parts of the dyestuff used in the first paragraph of Example 1, of the probable formula

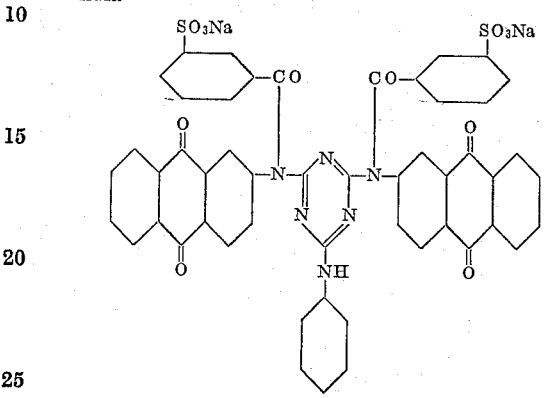

until the weight of the fabric shows an increase of 70%. The dyeing is then developed for 30 minutes at 50–60° C. in a bath containing per 1000 parts of water 100 parts of sodium chloride, 30 parts by volume of sodium hydroxide solution of 30% strength and 8 parts of sodium hydrosulfite. The dyeing is finished as described in Example 1.

EXAMPLE 3

Pad-Steam Process

A cotton fabric is padded as described in Example 2 and then, if desired after having been intermediately dried, impregnated with a bath containing per 1000 parts of water 30 parts of aqueous sodium hydroxide solution of 30% strength, 20 parts of sodium hydrosulfite and 100–200 parts of sodium chloride. The impregnated fabric is squeezed to a weight increase of 60–100%.

The fabric is then steamed for 30–120 seconds and finished as described in Example 1.

EXAMPLE 4

Pad-Roll Process

A cotton fabric is impregnated at 30° C. with a padding solution containing per 1000 parts of water 20 parts of the dyestuff used in Example 2, 60 parts of aqueous sodium hydroxide solution of 30% strength and 40 parts of rongalite. The fabric absorbs 60–100% of the liquor. The impregnated fabric is conveyed through an infrared zone or a steaming tunnel in which it is heated to about 80–85° C. and it is then introduced into a (preferably air-free) chamber heated at the above temperature or is preferably unrolled in it. The material is kept in said zone or chamber for 2–4 hours.

Oxidation, soaping and the other operations are performed as described in Example 1.

EXAMPLE 5

Two-Bath Cold-Roll Process

A cotton fabric is padded at 20° C. with a solution containing per 1000 parts of water 20 parts of the dyestuff used in Example 2. The fabric is then impregnated at 20° C., if desired after having been intermediately dried, with a solution containing per 1000 parts of water 200 parts of anhydrous sodium sulfate, 80 parts of aqueous sodium hydroxide solution of 30% strength and 40 parts of sodium hydrosulfite. The fabric is left to itself in the unrolled state for one hour and then finished in the usual manner.

EXAMPLE 6

One-Bath Steaming Process

A cotton fabric is padded at 30° C. with a solution containing per 1000 parts of water 20 parts of the dyestuff used in Example 2, 50 parts of urea, 50 parts of aqueous sodium hydroxide solution of 30% strength and 40 parts of rongalite, then dried at 60–80° C., steamed for 5–8 minutes and the dyeing is then finished as described in Example 1 by oxidation, soaping etc.

EXAMPLE 7

A dyebath containing per 1000 parts of water 10 parts of aqueous sodium hydroxide solution of 30% strength and 4.5 parts of sodium hydrosulfite is prepared and heated to about 50° C. An aqueous solution of 0.3 part of the dyestuff used in Example 2 is then added. Mercerized cotton yarn is introduced at a goods-to-liquor ratio of 1:20 into the dyebath prepared in this manner and a solution is then added in portions which contains per 1000 parts of water 20 parts of sodium chloride, and the yarn is treated for 30–45 minutes at about 50° C.

The yarn is finished as described in Example 1. When sodium hydrosulfite is replaced by thiourea dioxide an identical result is obtained.

EXAMPLE 8

0.24 part of the dyestuff which in the form of the free acid corresponds to the formula

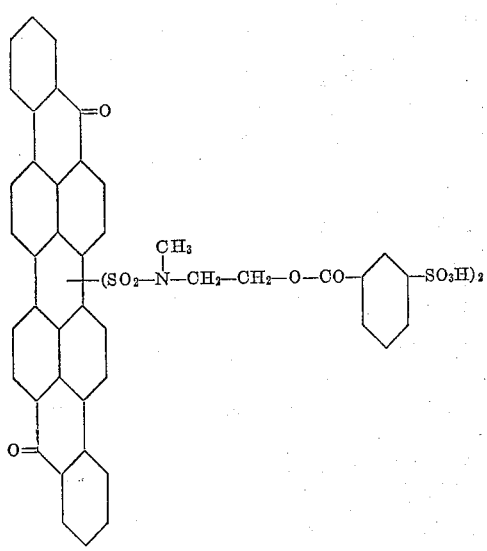

is dissolved in 50 parts of water at 60° C. The resulting blue solution is poured into a solution heated at 60° C. of 2 parts by volume of sodium hydroxide solution of 30% strength and 1.2 parts of sodium hydrosulfite in 350 parts of water. Immediately thereafter 10 parts of cotton are immersed in the dyebath and dyed for 45 minutes at 60° C. with addition of 12 parts of sodium chloride. The dyed cotton is oxidized, washed, acidified, once more thoroughly rinsed and soaped at the boil. The resulting strong, reddish blue dyeing has good fastness properties.

Identical dyeings are obtained when thiourea dioxide is used instead of sodium hydrosulfite.

The dyestuff of the above formula can be prepared by sulfochlorinating isodibenzanthrone with chlorosulfonic acid at 80° C., condensing the resulting disulfochloride in an aqueous suspension of N-methylethanolamine and esterifying with benzoic acid-meta-sulfochloride in pyridine at 100° C.

EXAMPLE 9

0.2 part of the dyestuff which in the form of its free acid corresponds to the formula

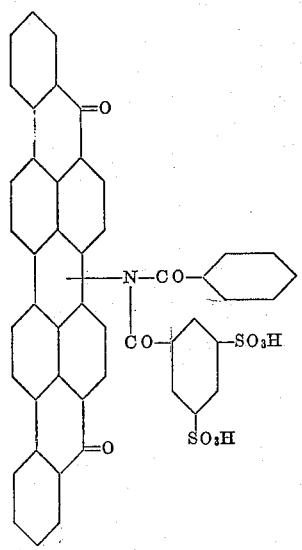

is dissolved in 50 parts of water at 60° C. The solution is poured into a solution heated at 60° C. of 6 parts by volume of sodium hydroxide solution of 30% strength and 1.2 parts of sodium hydrosulfite in 350 parts of water, whereupon spontaneous vatting sets in. 10 parts of cotton are dyed in the resulting dyebath for 45 minutes at 60° C. The dyed material is oxidized, washed, acidified, again thoroughly rinsed and soaped at the boil. The strong, greyish blue dyeing so obtained has good fastness properties.

The dyestuff used in this example can be prepared in the following manner: 5 parts of benzoic acid-3:5-disulfochloride are dissolved at the boil in 75 parts of anhydrous pyridine. 4.4 parts of benzoylaminodibenzanthrone are added to the pale-yellow solution and the whole is refluxed for 3 hours, allowed to cool, the pyridine is decanted from the precipitated condensation product and the residue is dissolved in 400 parts of water, saturated with sodium chloride. The dyestuff is filtered off and dried under reduced pressure at 60° C.

EXAMPLE 10

0.15 part of the dyestuff which in the form of its free acid corresponds to the formula

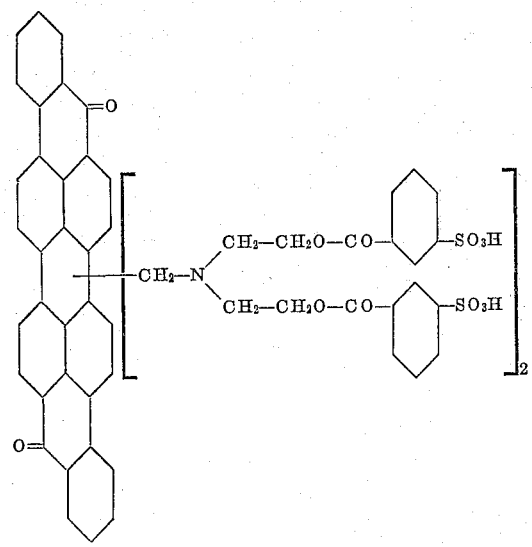

is used for dyeing as described in Example 9. The resulting bluish violet dyeing has good fastness properties.

The dyestuff can be prepared by condensing bis-chloromethylisodibenzanthrone with diethanolamine in dioxane and esterifying the condensation product with benzoic acid-metasulfochloride in pyridine at 100° C.

EXAMPLE 11

0.15 part of the dyestuff which in the form of its free acid corresponds to the formula

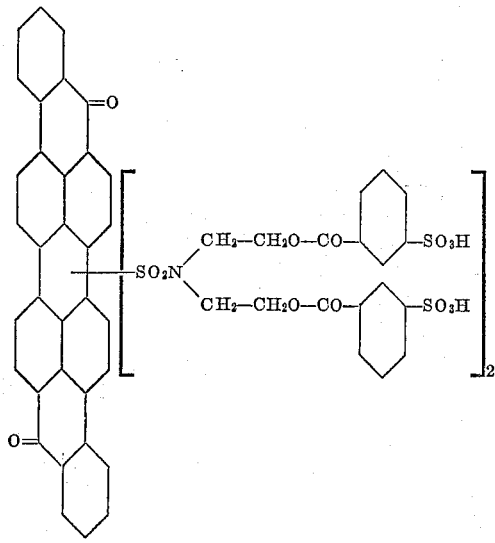

is used for dyeing as described in Example 8. The resulting strong, reddish blue dyeing has good fastness properties.

The dyestuff can be prepared in a manner similar to that described for the dyestuff of Example 8, by condensing isodibenzanthrone disulfochloride with diethanolamine.

Similar dyeings are obtained by using the dyestuff, prepared in a similar manner, of the formula

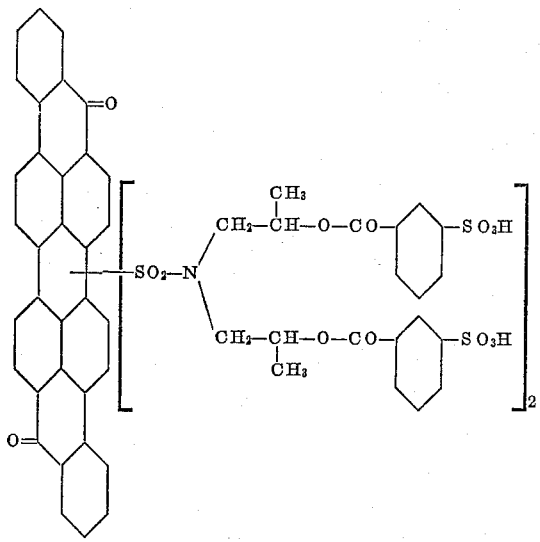

for dyeing as described in Example 9.

EXAMPLE 12

1.5 parts of the dyestuff which in the form of its free acid corresponds to the formula

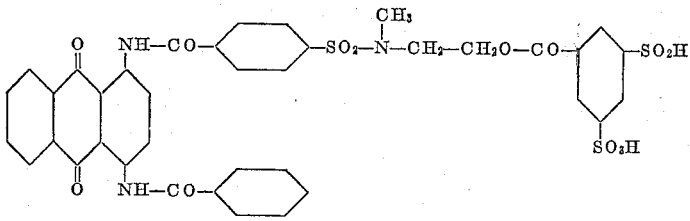

are used for dyeing as described in Example 1. The resulting pink dyeing has excellent properties of fastness.

The dyestuff can be prepared by esterifying the appropriate hydroxy compound with benzoic acid-3:5-disulfochloride in pyridine at 100° C.

EXAMPLE 13

0.3 part of the dyestuff of the formula

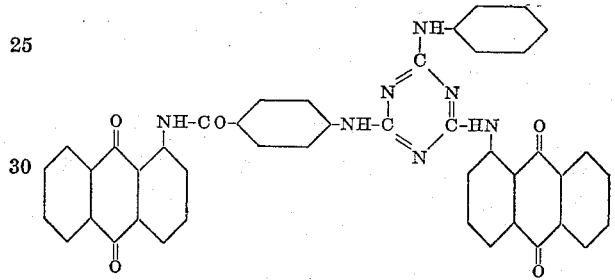

rendered water-soluble by condensation with benzoic acid-metasulfochloride in pyridine at 100° C., is used for dyeing as described in Example 8 but at 50° C. and with addition of 8 grams of sodium chloride. The resulting yellow dyeing has good fastness properties.

The dyestuff of the above formula can be prepared by condensing cyanuric chloride with para-aminobenzoic acid in an aqueous solution, converting the condensation product into the acid chloride condensing it with 2 molecular proportions of 1-aminoanthraquinone in nitrobenzene, and reactiong this dyestuff with aniline in nitrobenzene.

Similar dyeings can be produced with the dyestuff obtained by reacting benzoid acid-3:5-disulfochloride in pyridine with the condensation product from 1 molecular proportion of cyanuric chloride with 1 molecular proportion of 2-aminoanthráquinone, 1 molecular proportion of 4-amino-2:1-anthraquinoneacridone and 1 molecular proportion of aniline.

EXAMPLE 14

0.15 part of the dyestuff of the formula

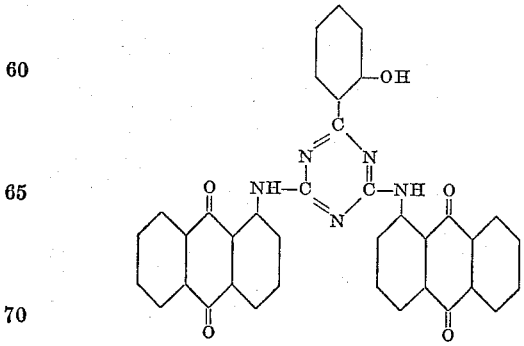

rendered water-soluble by condensation with benzoic acid-3:5-disulfochloride in pyridine at 100° C., is used for dyeing at 50° C. as described in Example 8. The resulting yellow dyeing has good fastness properties.

EXAMPLE 15

0.8 part of the dyestuff prepared by condensing the dyestuff of the formula

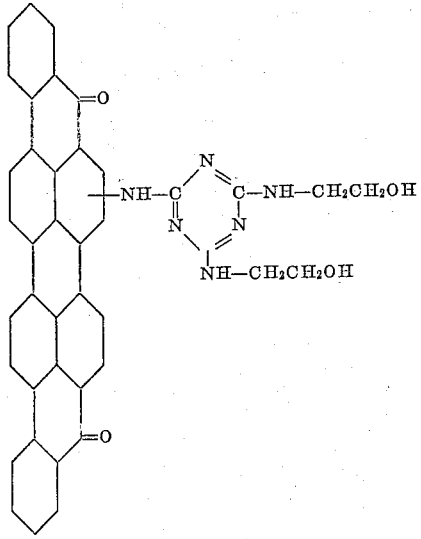

with benzoic acid-3:5-disulfochloride in pyridine is used for dyeing as described in Example 9. A blackish blue dyeing is obtained which has excellent fastness properties.

The dyestuff of the above formula used as starting material in the present example can be prepared by cyanuration of aminodibenzanthrone in nitrobenzene at 170–190° with addition of a catalytic amount of pyridine or dimethylformamide, and treating the resulting dichlorotriazine dystuff with an excess of ethanolamine.

EXAMPLE 16

0.2 part of the dyestuff obtained by condensing the dyestuff of the formula

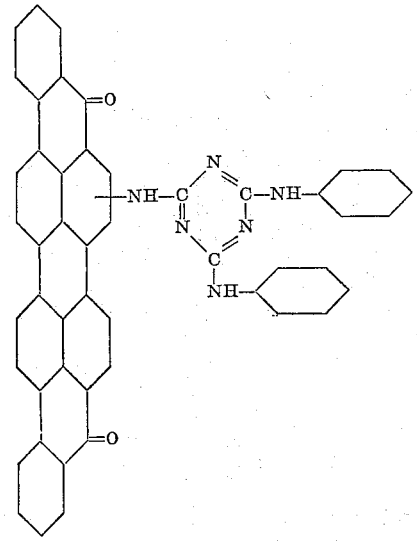

with benzoic acid-3:5-disulfochloride in pyridine is used for dyeing as described in Example 9. The resulting greyish green dyeing has very good fastness properties.

EXAMPLE 17

20 parts of the dyestuff obtained by condensing the dyestuff of the formula

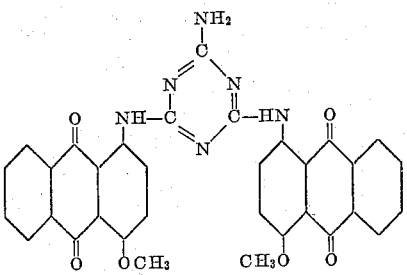

with the reaction product of benzoyl chloride with sulfur trioxide, prepared as described in French Patent No. 872,771, delivered February 3, 1942, to Farbenindustrie Aktiengesellschaft, Frankfurt am Main, Germany, are used for dyeing as described in Example 6. A fast red dyeing is obtained.

Dyeing can be performed in an identical manner with the water-soluble dyestuffs prepared according to Example 8 of U.S. Patent No. 2,171,262 by condensing 1:5-dibenzoylamino - 4:8 - dihydroxyanthraquinone or dihydroxy-N-dihydro - 1:2; 2':1'-anthraquinonazine with benzoic acid-3:5-disulfochloride in pyridine.

EXAMPLE 18

1.6 parts of the dyestuff of the probable formula

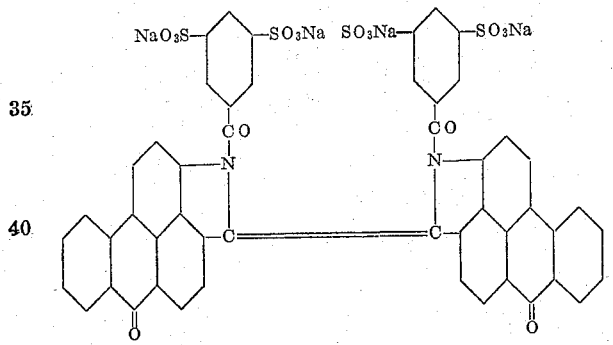

are dissolved in 50 parts of water at 60° C. The solution is poured into a solution heated at 60° C. of 12 parts by volume of sodium hydroxide solution of 30% strength and 3.2 parts of sodium hydrosulfite in 350 parts of water. 10 parts of cotton are immediately thereafter immersed in the dyebeth and dyed for 30 minutes at 60° C. In the course of 15 minutes the dyebath is raised to 80° C. and the cotton is dyed at this temperature for another 30 minutes. The dyed material is rinsed in running water until complete oxidation has been achieved and then finished in the usual manner. The resulting strong olive-black dyeing has good fastness properties.

The dyestuff can be prepared in the following manner: 12.8 parts of benzoic acid-3:5-disulfochloride are introduced and dissolved in 100 parts of anhydrous pyridine at 80° C. At 100° C. 5.1 parts of the dyestuff of the probable formula

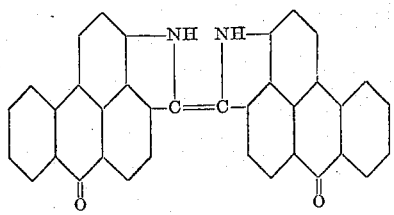

are added and the whole is stirred for 2 minutes at 100° C. until a specimen of the mixture is completely water-soluble. The mixture is then allowed to cool, the pyridine is decanted and the residue dissolved in 1000 parts of water. The whole is accurately neutralized with sodium hydroxide solution at 40° C., clarified by filtration, once more acidified with hydrochloric acid and the dyestuff is salted out with 200 parts of sodium chloride, filtered off and dried under reduced pressure at 60–70° C.

EXAMPLE 19

A printing paste is prepared from 20 parts of the dyestuff used in Example 1
200 parts of water
700 parts of potassium carbonate thickening
80 parts of rongalite 1000 parts

*Composition of the Potassium Carbonate Thickening*

80 parts of wheat starch
90 parts of cold water
100 parts of glycerol
140 parts of British gum powder
170 parts of tragacanth mucilage 60/1000
170 parts of potassium carbonate
240 parts of water 1000 parts A cotton or spun rayon fabric is printed with this printing paste on a roller printing machine, then dried and steamed for 8 minutes at 100° C. on a Mather-Platt ager and finally finished in the usual manner. A yellow print is obtained which has excellent fastness properties.

What is claimed is:

1. Process for dyeing cellulose textile material with vat dyestuffs in which at their highest stable stage of oxidation at least one hydrogen atom bound to a member selected from the group consisting of an oxygen and a nitrogen atom has been relaced by an organic acyl radical of the formula

in which $n$ is a whole number from 1 to 2, which comprises reducing the dyestuff to the leuco form in the presence of a reducing agent and an alkali, splitting off the organic acyl radical and oxidizing the leuco-compound on the fiber.

2. A process as claimed in claim 1, wherein the textile material is padded with an aqueous solution of the vat-dyestuff and the padded material is treated with an aqueous solution of an alkali and a reducing agent and then subjected to a heat-treatment.

3. A process as claimed in claim 1, wherein the textile material is padded with an aqueous solution containing the vat-dyestuff, an alkali and a reducing agent, and the padded material is subjected to a heat-treatment.

4. A process as claimed in claim 1, wherein the textile material is immersed at a temperature between 20° to 90° C. in an aqueous solution containing the vat-dyestuff, an alkali hydroxide and a strong reducing agent.

5. A process as claimed in claim 1, wherein the strong reducing agent is a hydrosulfite.

6. A process as claimed in claim 1, wherein there is used a dyestuff of the formula

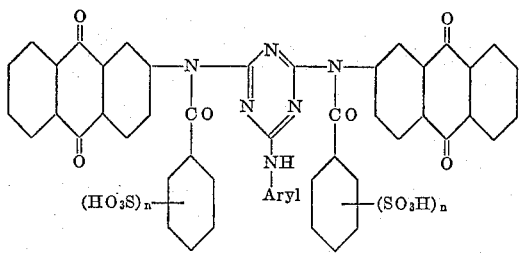

in which $n$ is a whole number from 1 to 2.

7. A process as claimed in claim 1, wherein there is used the dyestuff of the formula

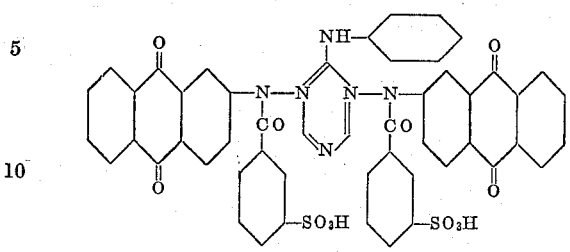

8. A process as claimed in claim 1, wherein there is used the dyestuff of the formula

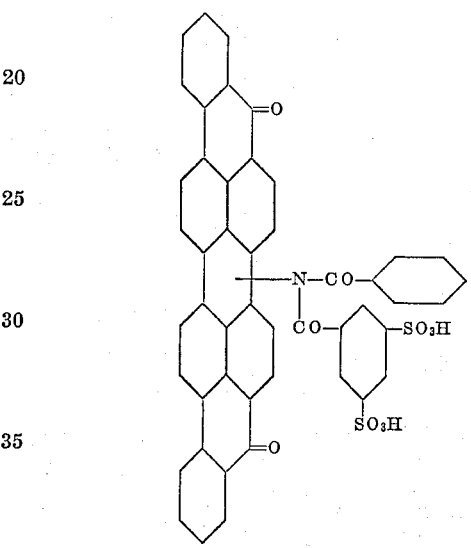

9. A cellulose textile material which has been colored by the process claimed in claim 1.

10. A process as claimed in claim 1, wherein the textile material is printed with a printing paste containing the water-soluble vat dyestuff, an alkali and a reducing agent, and the printed material is subjected to heat treatment.

11. In a process for dyeing a cellulose textile material by applying thereto a vat dyestuff, the improvement wherein the vat dyestuff is one in which at least one hydrogen atom has been replaced by an organic acyl radical containing at least one group rendering said dyestuff water-soluble, and wherein a reducing agent and an alkali are added to the dyestuff at the earliest time immediately prior to the application of the dyestuff to the textile material, thereby reducing the dyestuff to its leuco-form, splitting off the organic acyl radical and fixing the leuco compound on the fibers of the textile material, and said leuco compound is thereafter oxidized on the fiber.

12. Process for printing cellulose textile material with vat dyestuffs in which at their highest stable stage of oxidation at least one hydrogen atom bound to a member selected from the group consisting of an oxygen and a nitrogen atom has been replaced by an organic acyl radical of the formula

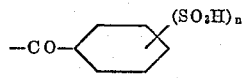

in which $n$ is a whole number from 1 to 2, which comprises reducing the dyestuff to the leuco form in the presence of a reducing agent and an alkali, splitting off the organic acyl radical and oxidizing the leuco-compound on the fiber.

(References on following page)

References Cited in the file of this patent

UNITED STATES PATENTS

| | | |
|---|---|---|
| 1,903,870 | Mieg et al. | Apr. 18, 1933 |
| 1,903,871 | Mieg et al. | Apr. 18, 1933 |
| 1,933,993 | Mieg et al. | Nov. 7, 1933 |
| 2,095,600 | Graenacher et al. | Oct. 12, 1937 |
| 2,235,480 | Graenacher et al. | Mar. 18, 1941 |
| 2,256,808 | Kern | Sept. 23, 1941 |
| 2,447,993 | Vieira | Aug. 24, 1948 |
| 2,487,197 | Stott et al. | Nov. 8, 1949 |
| 2,749,341 | Staeuble | June 5, 1956 |

OTHER REFERENCES

Venkataraman: Synthetic Dyes, Academic Press, Inc., publishers, N.Y., 1952, vol. 2, p. 882.